Nov. 7, 1933.                F. G. WITHROW                1,933,888
                              MIRROR BRACKET
                           Filed Oct. 29, 1929
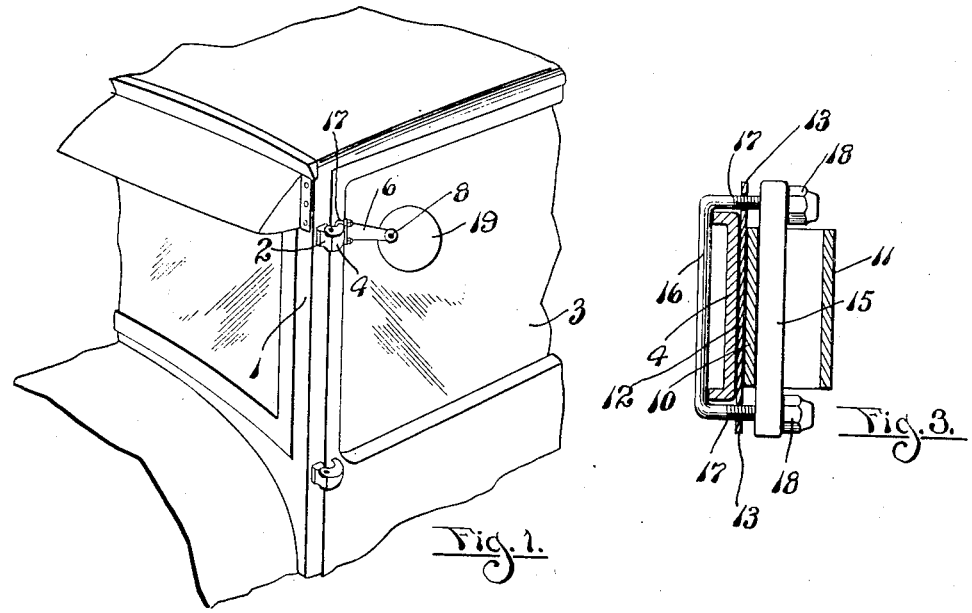
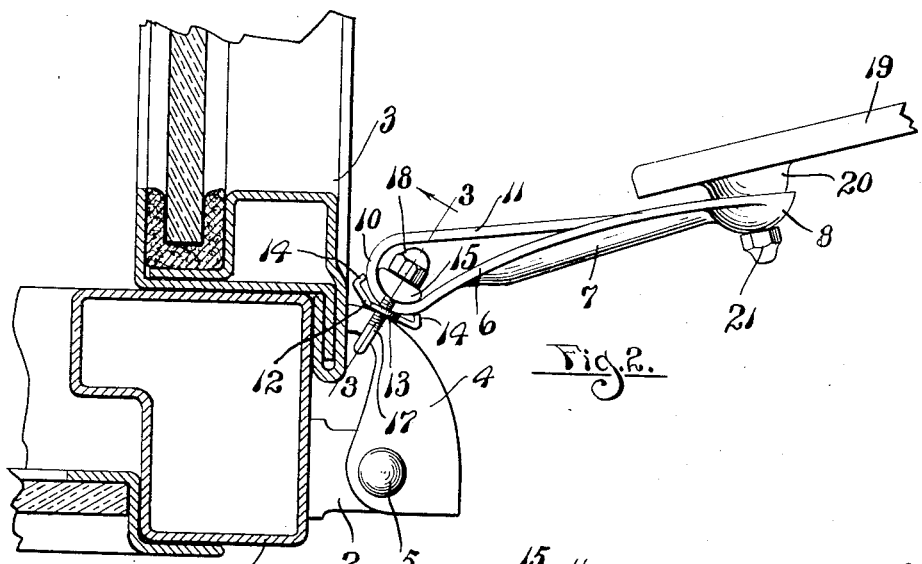
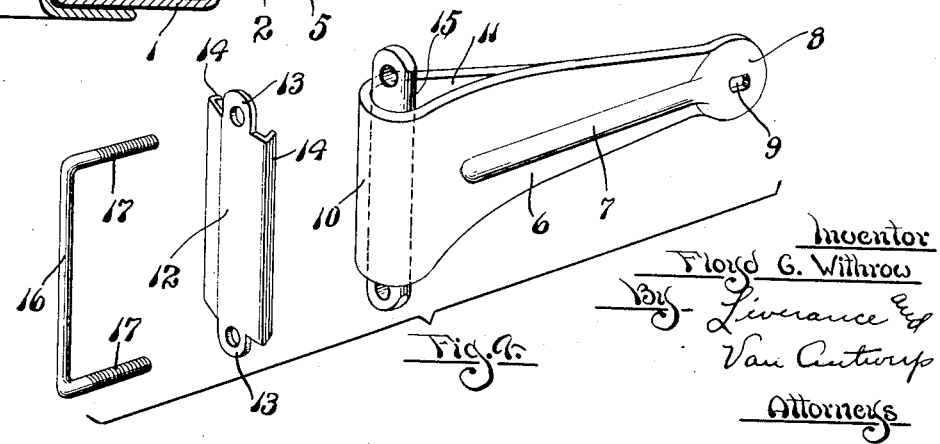
Inventor
Floyd G. Withrow
By Liverance and
Van Anturp
Attorneys Patented Nov. 7, 1933

1,933,888

UNITED STATES PATENT OFFICE 1,933,888

MIRROR BRACKET

Floyd G. Withrow, Grand Rapids, Mich.

Application October 29, 1929. Serial No. 403,155

4 Claims. (Cl. 45—97)

This invention relates to a mirror bracket and means for connecting the same to a motor vehicle. It is a primary object and purpose of the present invention to provide a mirror bracket for mounting a mirror on the upper hinge of the front door of an automobile so that the mirror is swung with the door in its movements, and to further provide a very simple, practical and economically constructed bracket whereby mounting the mirror on the door hinge may be very readily accomplished and with which vibration of the mirror is eliminated. A further object of the invention is to provide a mirror bracket and attaching means therefor for connecting to the hinge which, while it maintains the mirror in any position to which it may be adjusted, may be easily operated so that the bracket and attached mirror can be moved substantially about a vertical axis at the inner end of the bracket to different positions and will maintain the position to which moved, this without releasing any of the parts or requiring the use of tools to accomplish the adjustment desired. A still further object of the invention is to mount the mirror at the outer end of the bracket so that the mirror may be turned about an axis offset from the center of the mirror, this permitting the mirror itself to be raised or lowered or moved inward and outward to an indefinite number of positions on the axis about which it turns.

The construction for the attainment of the ends stated is fully described in the following description, taken in connection with the accompanying drawing, in which, Fig. 1 is a fragmentary perspective view illustrating the mounting of the mirror by use of the bracket of my invention on the upper hinge of the front door of an automobile.

Fig. 2 is a fragmentary enlarged horizontal section and plan, the section being taken in a plane above the mirror bracket.

Fig. 3 is a vertical section substantially on the plane of line 3—3 of Fig. 2 looking in the direction indicated by arrow, and Fig. 4 is a perspective view of the various parts used in adjustably securing the mirror bracket to the door hinge, said parts being separate from each other.

Like reference characters refer to like parts in the different figures of the drawing.

In the construction of the ordinary closed body of an automobile, front posts 1 of sheet metal are used between which the windshield is located and the upper hinges for mounting the front door are connected with these posts. Said hinge on the post includes a hinge member 2 permanently secured thereto. The door 3 has the other hinge member 4, of the form best shown in Fig. 2, permanently secured to and adjacent the front edge of the door and it is pivotally connected to the other hinge member 2 by a vertical pivot pin 5.

It is on this upper hinge at the left hand side of the automobile that the mirror bracket with the mirror at its outer end is designed to be mounted. In the construction of the mirror bracket a length of flat metal is used and is bent back upon itself, one side 6 thereof having a suitable reinforcing rib 7 and at the outer end formed into a concaved cup 8 through the center of which an oblong slot 9 is cut, that is, the length of the slot is greater than the width. The bend at 10 is an open bend substantially a half circle and the other side 11 of the bracket extends from the bend 10, its free end coming against the side 6 to which it is permanently secured, preferably by welding.

In applying the bracket to the hinge member 4, a spring retaining device is used between the outer side of the curved end 10 of the bracket and the outer side of the hinge member 4. This spring holding or retaining member is a plate 12 of flat spring metal of the form best shown in Fig. 4 which, at each end, is provided with a projecting ear 13 and at each side edge with an angularly disposed lip 14. The length of the member 12 is such that when the bend at the end 10 is brought against it, the ears 13 extend beyond the upper and lower edges of the bracket and the angularly disposed lips 14 bear against the outer side of the curved end or bend 10. A U-shaped rod having an intermediate connecting portion 16 and two threaded legs 17 bent at right angles therefrom passes around the hinge member 4 at its inner side, one leg 17 lying above and the other below the hinge member 4. Said legs pass through openings in the ears 13 and thence through openings adjacent the ends of a bar 15 which is extended through the bracket at the inner side of the bend 10 and is convexed at one side to bear against the inner curved side of said bend 10, as best shown in Fig. 2. Nuts 18 threaded onto the ends of the legs 17 are used to bind the parts securely together. With the tightening of the nuts the lips 14 engaged against the outer side of the bend 10 cause the plate 12 to be sprung and thus develop a pressure against the curved end of the bracket which holds it in any position to which it may be set; but on grasping the bracket, or the mirror which is to be secured at its outer end, the bracket can be turned forward or back, plate 12 yielding to permit such movement but immediately acting to hold the bracket in the position to which moved when the bracket is released.

The mirror 19, preferably of circular form, has the usual reflecting glass at its rear side and the metal back is formed with an outwardly extending convex member 20 which is received within the concaved side of the cup 8, a screw passing through the opening 9, its head being within the member 20 and its shank being flattened on both sides to conform to the oblong opening at 9. A nut 21 on the end of the screw, when tightened, holds the mirror in place against accidental movement. But by grasping the mirror it may be turned about the axis of the screw used to connect it with the bracket so that the mirror may be raised or lowered or turned inwardly so as to lie wholly back of the bracket supporting it. This follows by reason of the off center or eccentric position of the part 20 with respect to the mirror center.

The mirror bracket construction described and the manner in which it is connected to the outer end of the bracket are features of considerable merit in devices of this kind. The bracket construction is strong and durable and capable of fully withstanding all the usage to which it is subjected and at the same time is particularly economical to manufacture. The spring retaining member between the curved end of the bracket and the hinge member holds the bracket in any position desired yet permits its adjustment to the front or rear without requiring the use of tools, the adjustment being made instantly, and at the same time serves to hold the bracket against any undesired movement or any vibration coming from road shocks as the automobile passes over the road. The mounting of the mirror to turn about an eccentric axis is also a very desirable feature of the invention productive of ready and easy adjustment of the mirror on the bracket to an indefinite number of positions around the axis about which it is movable. All these features combine to make the invention one of exceptional practical value. The invention is defined in the appended claims and is to be considered comprehensive of all forms of structure coming within its scope.

I claim:

1. In combination, a bracket comprising a length of flat metal bent back upon itself to form an arm having a rounded end of substantially semi-cylindrical form, a mirror secured to the other end of said arm, a spring retaining device comprising a plate of spring metal having angularly disposed lips at its side edges located against the rounded end of said bracket, a U-shaped securing member having spaced legs passing through the ends of said retaining member, a bar located against the inner side of said rounded end portion of the bracket, said legs passing through the ends of the bar, and nuts threaded onto the ends of legs against said bar, for the purposes described.

2. In combination with an automobile hinge, of a bracket arm formed from a length of metal bent upon itself, the free end portions of said metal being connected together and the bend therein being of open substantially semi-cylindrical form, a spring holding plate disposed between the rounded end of said bracket arm and said hinge, said plate being provided with means at its side edges to bear against the rounded end of the arm, means passing around the hinge combined with means extending through said open rounded end portion of the arm for securing said bracket arm to the hinge and clamping the spring holding member between them, and a mirror secured to the outer end of said bracket arm.

3. In combination with a hinge comprising two pivotally connected hinge members, a bracket arm comprising two sides located against each other adjacent one end and secured together and integrally connected at their opposite ends by a continuous substantially cylindrical open bend, of a bar passing through said arm at the bend therein, a U-shaped stirrup located around one of said hinge members and having legs extending one above and the other below said hinge member through said bar, nuts threaded on to the ends of the legs against the bar, a friction spring holding member located between said bend at said end of the arm and the hinge and sprung out of normal form on tightening said nuts and thereby frictionally engaging the rounded end of said arm to normally hold it against movement, and a mirror connected to the opposite end of said arm.

4. In combination, a bracket comprising an arm having an opening through one end thereof, a mirror or the like secured to the other end of the arm, a securing member having portions located near either end of said opening, means extending through said opening, said means being cooperatively associated with the securing member whereby said securing member may be drawn towards the end of said arm, and a friction holding member located between the end of said arm and the said securing member for the purpose described.

FLOYD G. WITHROW.